(12) United States Patent
Finstad (10) Patent No.: US 10,300,741 B2
(45) Date of Patent: May 28, 2019

(54) APPARATUSES FOR LOCKING A CASTER WHEEL IN A STEERING POSITION

(71) Applicant: Cannon Equipment LLC, Cannon Falls, MN (US)

(72) Inventor: Clemance Bernard Finstad, Bay City, WI (US)

(73) Assignee: Cannon Equipment LLC, Cannon Falls, MN (US)

( * ) Notice: Subject to any disclaimer, the term of this patent is extended or adjusted under 35 U.S.C. 154(b) by 0 days.

(21) Appl. No.: 15/697,637

(22) Filed: Sep. 7, 2017

(65) Prior Publication Data

US 2018/0104986 A1    Apr. 19, 2018

Related U.S. Application Data

(60) Provisional application No. 62/409,951, filed on Oct. 19, 2016.

(51) Int. Cl.
| *B60B 33/02* | (2006.01) |
| *B60B 35/00* | (2006.01) |
| *B62B 3/00* | (2006.01) |
| *B60B 33/00* | (2006.01) |

(52) U.S. Cl.
CPC .......... *B60B 33/02* (2013.01); *B60B 33/0002* (2013.01); *B60B 33/025* (2013.01); *B60B 35/003* (2013.01); *B62B 3/001* (2013.01); *B60B 2200/43* (2013.01); *B62B 3/002* (2013.01); *B62B 2301/0463* (2013.01)

(58) Field of Classification Search
CPC ....... B60B 33/02; B60B 35/003; B62B 3/001; B62B 2301/0463; A61G 1/0243

USPC ......................................................... 16/35 R
See application file for complete search history.

(56) References Cited

U.S. PATENT DOCUMENTS

| 1,599,485 | A | * | 9/1926 | Perin | ...................... | B60B 33/021 |
| | | | | | | 16/22 |
| 1,661,889 | A | * | 3/1928 | French | ...................... | F16H 7/18 |
| | | | | | | 16/35 R |
| 2,654,112 | A | * | 10/1953 | Milhizer | ................. | B60B 33/02 |
| | | | | | | 16/31 R |
| 2,972,163 | A | * | 2/1961 | Ross | ...................... | B60B 33/021 |
| | | | | | | 16/35 R |
| 4,037,291 | A | * | 7/1977 | Huempfner | ............. | B60B 33/02 |
| | | | | | | 16/35 D |
| 4,248,445 | A | * | 2/1981 | Vassar | ................... | B60B 33/021 |
| | | | | | | 16/35 R |
| 4,336,629 | A | * | 6/1982 | Jarvis, Jr. | ............ | B60B 33/0078 |
| | | | | | | 16/35 R |
| 4,349,938 | A | * | 9/1982 | Fontana | .............. | B60B 33/0078 |
| | | | | | | 16/35 R |
| 4,570,288 | A | * | 2/1986 | Kassai | ................ | B60B 33/0078 |
| | | | | | | 16/35 R |
| 8,931,420 | B2 | | 1/2015 | Larson et al. | | |

(Continued)

*Primary Examiner* — Roberta S Delisle
(74) *Attorney, Agent, or Firm* — ARDRUS INTELLECTUAL PROPERTY LAW, LLP (57) ABSTRACT

An apparatus is for locking a caster wheel in a steering position about a steering axis. The apparatus comprises a base member; a lever arm; and an engagement member. The lever arm is movable with respect to the base member into and between an engaged position in which the engagement member locks the caster wheel in the steering position and a disengaged position in which the caster is steerable out of the steering position.

21 Claims, 6 Drawing Sheets

(56) References Cited

U.S. PATENT DOCUMENTS

| | | |
|---|---|---|
| 9,149,114 B2 | 10/2015 | Finstad, III et al. |
| 9,428,205 B2 | 8/2016 | Jackson et al. |
| 2001/0029643 A1* | 10/2001 | Schroeder ............ B60B 33/0021 16/35 R |
| 2016/0082996 A1 | 3/2016 | Jackson et al. |

* cited by examiner

APPARATUSES FOR LOCKING A CASTER WHEEL IN A STEERING POSITION

CROSS-REFERENCE TO RELATED APPLICATION

This application claims the benefit of and priority to U.S. Provisional Patent Application No. 62/409,951, filed Oct. 19, 2016, which is hereby incorporated by reference in entirety.

FIELD

The present disclosure relates to caster wheels for carts.

BACKGROUND

U.S. Patent Application Publication No. 2016/0082996 discloses a security cart having a rear wall, a wheeled base frame connected to the rear wall and a base shelf pivotable between a horizontal position and a raised position. A first sidewall and a first door pivotally connected to the first sidewall are movable from locked positions with the base shelf to a folded position forwardly of the rear wall. A second sidewall and a second door pivotally connected to the second sidewall are movable from locked positions to a folded position forwardly of the folded first sidewall and first door. The base shelf is movable from the horizontal position to the raised position, and retained against the folded first sidewall and the first door and the folded second sidewall and second door.

U.S. Pat. No. 9,428,205 discloses a security cart having a rear wall, a wheeled base frame connected to the rear wall and a base shelf pivotable between a horizontal position and a raised position. A first sidewall and a first door pivotally connected to the first sidewall are movable from locked positions with the base shelf to a folded position forwardly of the rear wall. A second sidewall and a second door pivotally connected to the second sidewall are movable from locked positions to a folded position forwardly of the folded first sidewall and first door. The base shelf is movable from the horizontal position to the raised position, and retained against the folded first sidewall and the first door and the folded second sidewall and second door.

U.S. Pat. No. 9,149,114 discloses a cabinet having a deep shelf with limited access is described and includes at least two opposite sides carrying track means to permit easy adjustment of the shelf between two or more levels by a single person maneuvering only the one accessible end of the shelf. The cabinet can be mounted on wheels to form a cart. One or more such adjustable shelves can be provided. The shelves may be positioned just above the bottom of the cart to provide a maximum depth cart for use, in intermediate positions for use with smaller objects and/or at the very top and/or side of the cart and locked in position to provide a secured interior for the cabinet.

U.S. Pat. No. 8,931,420 discloses a pallet or cart which can be coupled to a similar pallet or cart in a side by side relationship. The pallet or cart, at its one or right side, has a coupling, which cooperates with an associated coupling on the opposite or left side of an adjacent pallet or cart. The couplings and the associated couplings can be connected to connect the two pallets or carts together to make them capable of being moved together, and even be lifted and lowered together by a standard lift truck or fork lift or a standard pallet jack. The couplings are also releasable so that, when necessary, each pallet or cart may be used as would be a single pallet or cart. The pallet or cart may have one or more foldable shelves therein.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

An apparatus is for locking a caster wheel in a steering position about a steering axis. The apparatus comprises a base member, a lever arm, and an engagement member. The lever arm is movable (e.g. pivotable) with respect to the base member into and between an engaged position in which the engagement member locks the caster wheel in the steering position and a disengaged position in which the caster is steerable out of the steering position.

BRIEF DESCRIPTION OF THE DRAWINGS

The present disclosure includes the following Figures. The same numbers are used throughout the Figures to reference like features and like components.

DETAILED DESCRIPTION OF THE DRAWINGS

The Figures depict an apparatus 20 according to the present disclosure for locking a caster wheel 22 in a particular steering position with respect to a cart 24. The type and configuration of caster wheel 22 and cart 24 can vary from that which is shown. In the example shown in FIGS. 9-12, the caster wheel 22 swivels about a caster wheel axis 26. The caster wheel 22 is mounted to the cart 24 via a pedestal 28 and a raceway 30, which is normally rotatable about the caster wheel axis 26 with respect to the pedestal 28 until being locked in position by the apparatus 20. Opposed supporting ears 32 are on the raceway 30 and support a wheel 34, which is freely rotatable about a wheel axis 36, all as is conventional.

Referring to FIGS. 1-8, the apparatus 20 includes a base member 38, which in the illustrated example includes a first bracket 40 that is fixed to the pedestal 28 by fasteners 42 (FIG. 10) and a second bracket 44 that is fixed to the first bracket 40 by fasteners 45. The configuration of the base member 38 can vary from what is shown. The apparatus 20 further includes a lever arm 46, which carries an engagement member 48. The lever arm 46 has a first end 50 that is coupled to the base member 38 at a pivot joint 52 by a fastener 54. The lever arm 46 further includes a second end 56 that is configured for engagement by an operator, for example either manually or by the operator's foot. The second end 56 includes a downwardly turned handle 58 which accommodates use by an operator. The configuration of the lever arm 46 can vary from what is shown. As shown and described herein below, the lever arm 46 is movable (e.g., pivotable) with respect to the base member 38 into and between an engaged position (see FIGS. 1, 4 7, 10 and 11) in which the engagement member 48 locks the caster wheel 22 in a fixed steering position and a disengaged position (see FIGS. 2, 5, 8, and 12) in which the caster wheel 22 is steerable out of (i.e., away from) the noted steering position.

The base member 38 includes a sidewall 62 through which the second end 56 of the lever arm 46 extends. The sidewall 62 has an elongated slot 64 through which the second end 56 of the lever arm 46 extends. The elongated slot 64 includes a first end 66 in which the first end 50 of the lever arm 46 seats when the lever arm 46 is in the noted engaged position and a second end 68 in which the first end 50 of the lever arm 46 seats when the lever arm 46 is in the noted disengaged position. The second end 56 of the lever arm 46 is slideable back and forth in the elongated slot 64 between the noted first and second ends 66, 68. A transverse slot 70 located at the second end 68 of the elongated slot 64 defines a detent that retains the lever arm 46 in the noted disengaged position (against the bias of a spring 60, as described herein below) until the second end 56 of the lever arm 46 is moved by the operator transversely to the second end 68 of the elongated slot 64. An axial clearance is provided between the fastener 54, the lever arm 46, and the base member 38 to accommodate movement of the second end 56 of the lever arm 46 between the first and second ends 66, 68 and transversely in the transverse slot 70.

A spring 60 biases the lever arm 46 towards the engaged position. The spring 60 also biases the engagement member 48 into engagement with the caster wheel 22, specifically the raceway 30, when the lever arm 46 is in the engaged position. More specifically, the spring 60 has a first end 74 that acts upon a first end wall 72 of the base member 38 and a second end 76 that acts on a peripheral abutment surface 78 on the engagement member 48. The spring 60 is disposed around the engagement member 48. The first end 74 of the spring 60 engages the first end wall 72 and the second end 76 of the spring 60 engages the peripheral abutment surface 78. The base member 38 includes a second end wall 80. The lever arm 46 includes a third end wall 82. The engagement member 48 extends through the first, second, and third end walls 72, 80, 82. The engagement member 48 includes a head 83 (which in this example includes a washer and ring hog) which is disposed on an opposite side of the third end wall 82 with respect to the spring 60. The spring 60 biases the engagement member 48 away from the first end wall 72, which thereby pulls the head 83 towards the opposite side 84 of the third end wall 82, thereby biasing the lever arm 46 towards the engaged position. In the engaged position, the first end wall 72 and the third end wall 82 face each other, see e.g. FIG. 4. The spring 60 also has a natural resiliency that allows the engagement member 48 to be moved out of engagement with the raceway 30 of the caster wheel 22 when the lever arm 46 is in the engaged position, but tends to bias the engagement member 48 towards the raceway 30.

Figure 1:
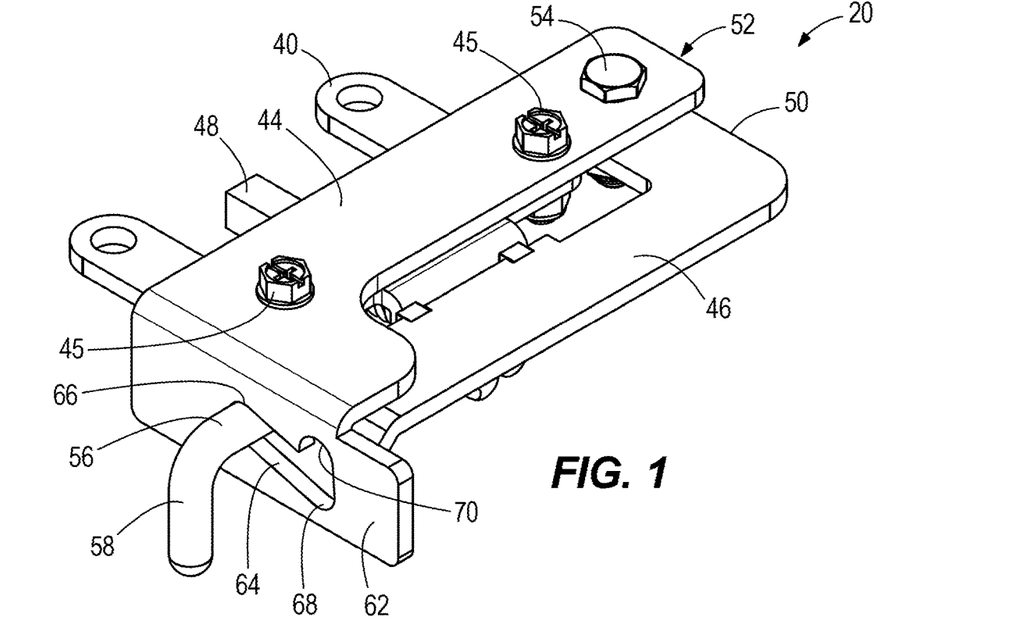
FIG. 1 is a top perspective view showing the apparatus according to the present disclosure in an engaged position.
Figure 2:
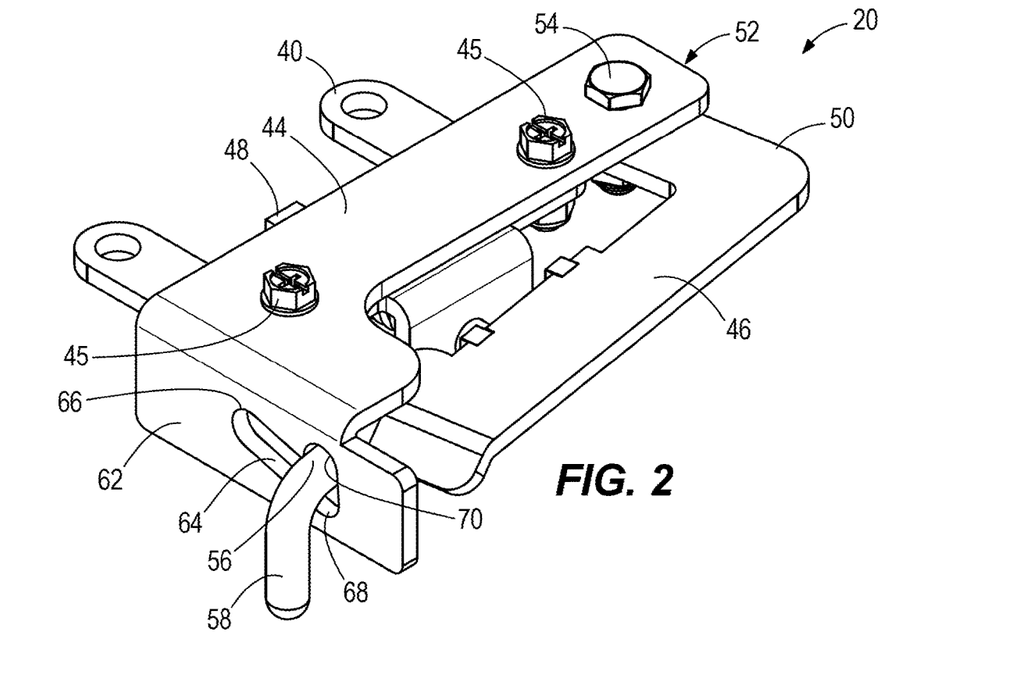
FIG. 2 is a top perspective view showing the apparatus in a disengaged position
Figure 3:
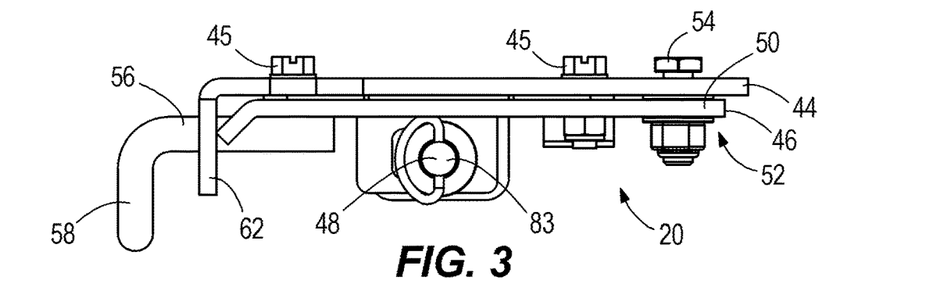
FIG. 3 is a side view of the apparatus.
Figure 4:
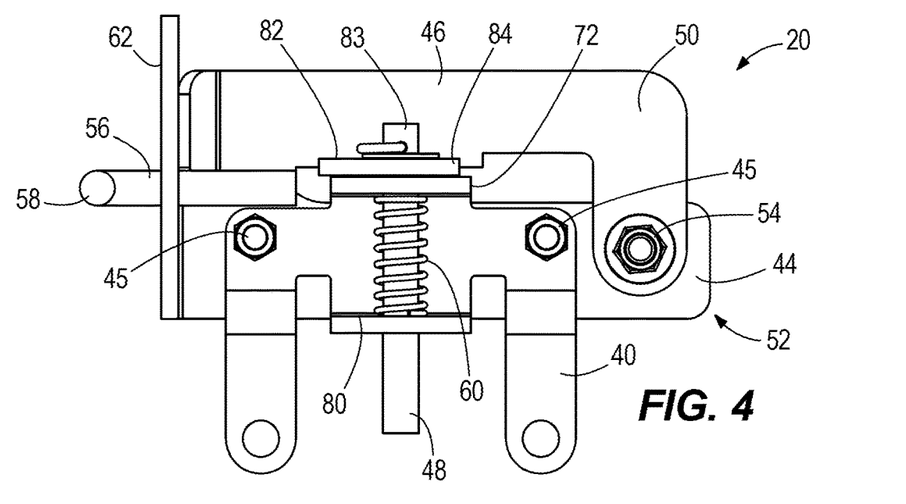
FIG. 4 is a bottom view of the apparatus in the engaged position.
Figure 5:
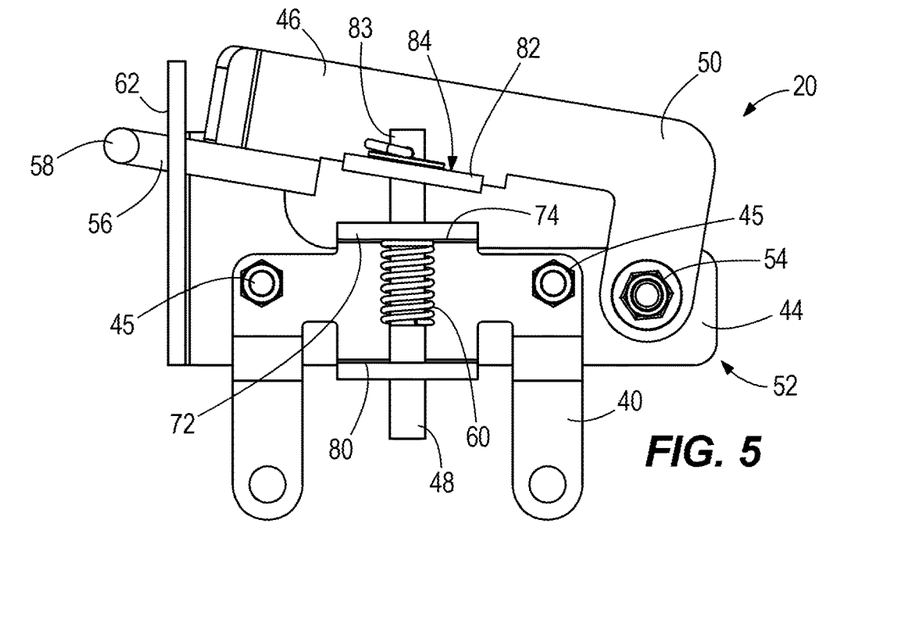
FIG. 5 is a bottom view of the apparatus in the disengaged position.
Figure 6:
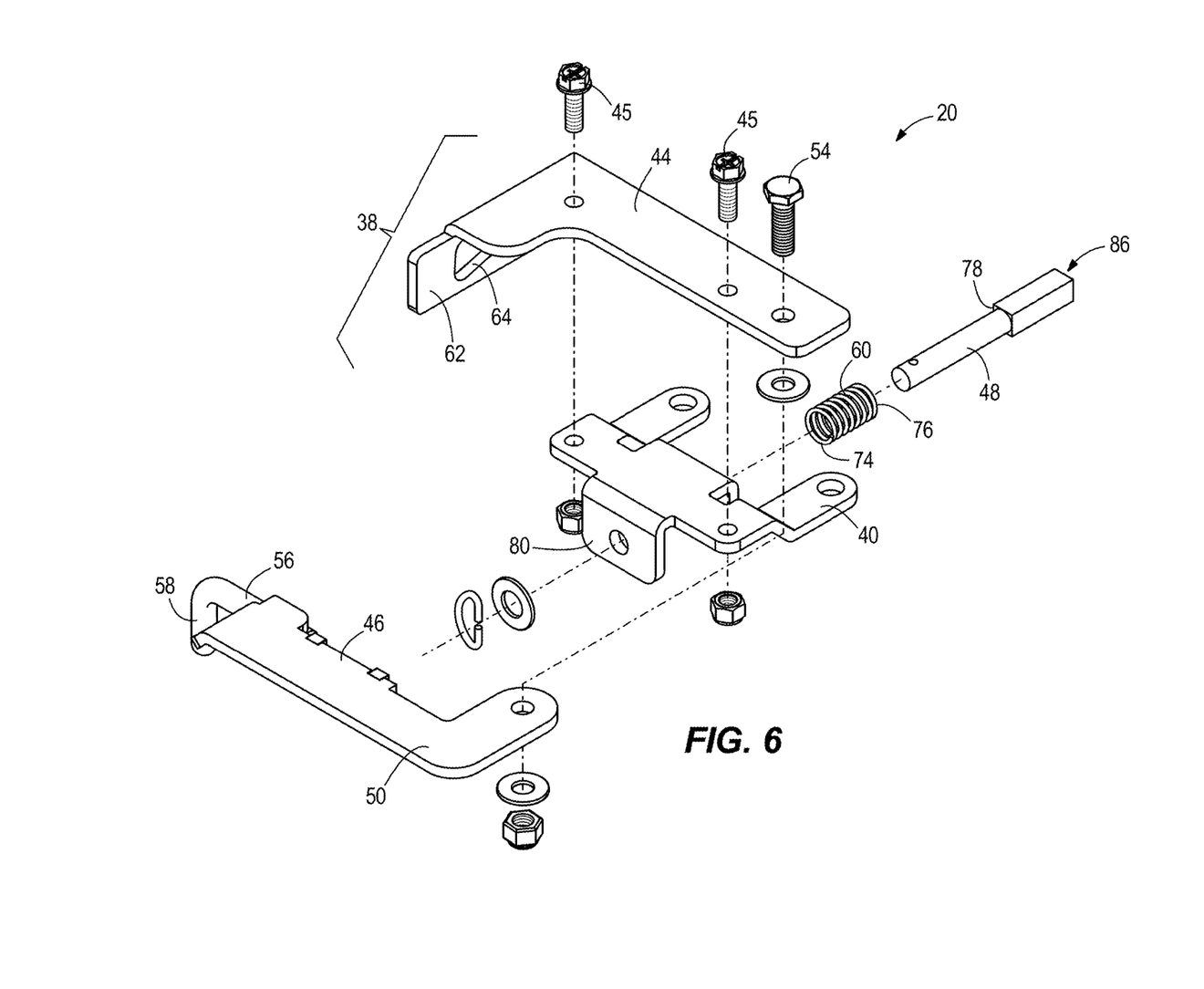
FIG. 6 is an exploded view of the apparatus.
Figure 7:
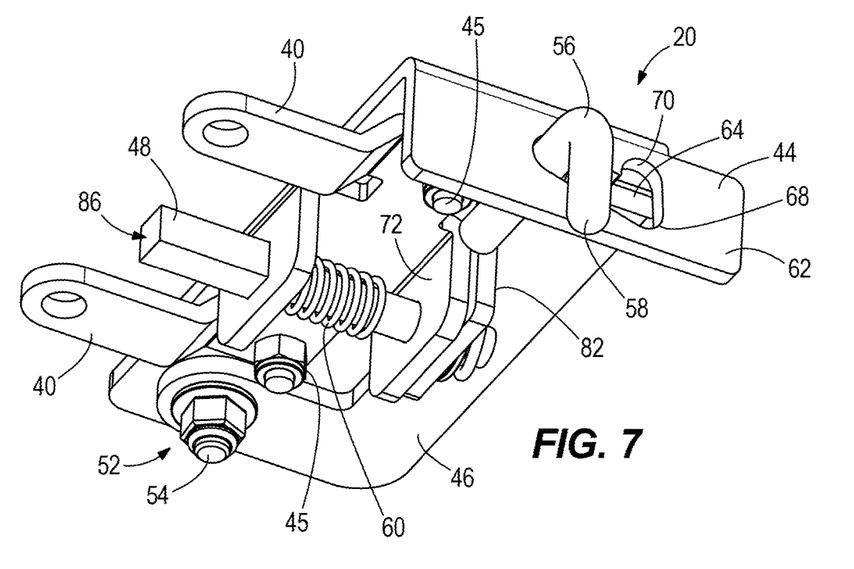
FIG. 7 is a bottom perspective view of the apparatus in the engaged position.
Figure 8:
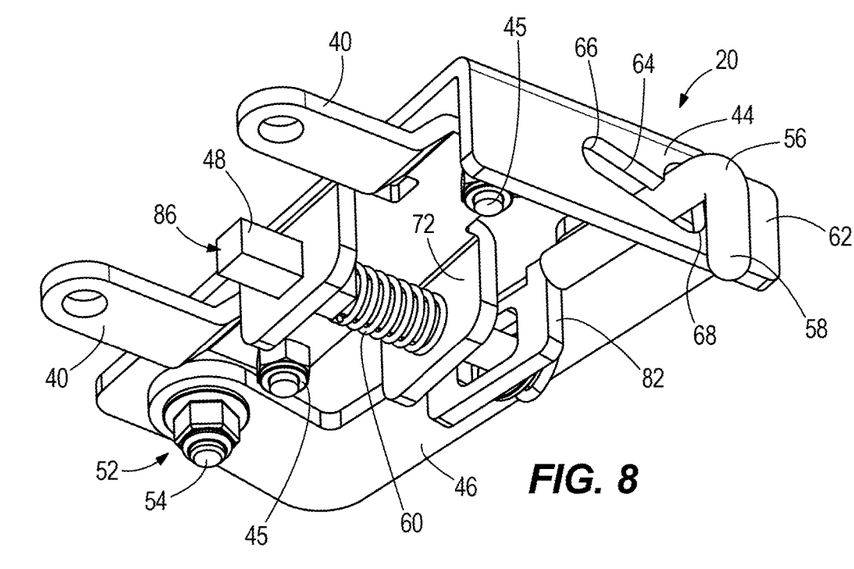
FIG. 8 is a bottom perspective view of the apparatus in the disengaged position.
Figure 9:
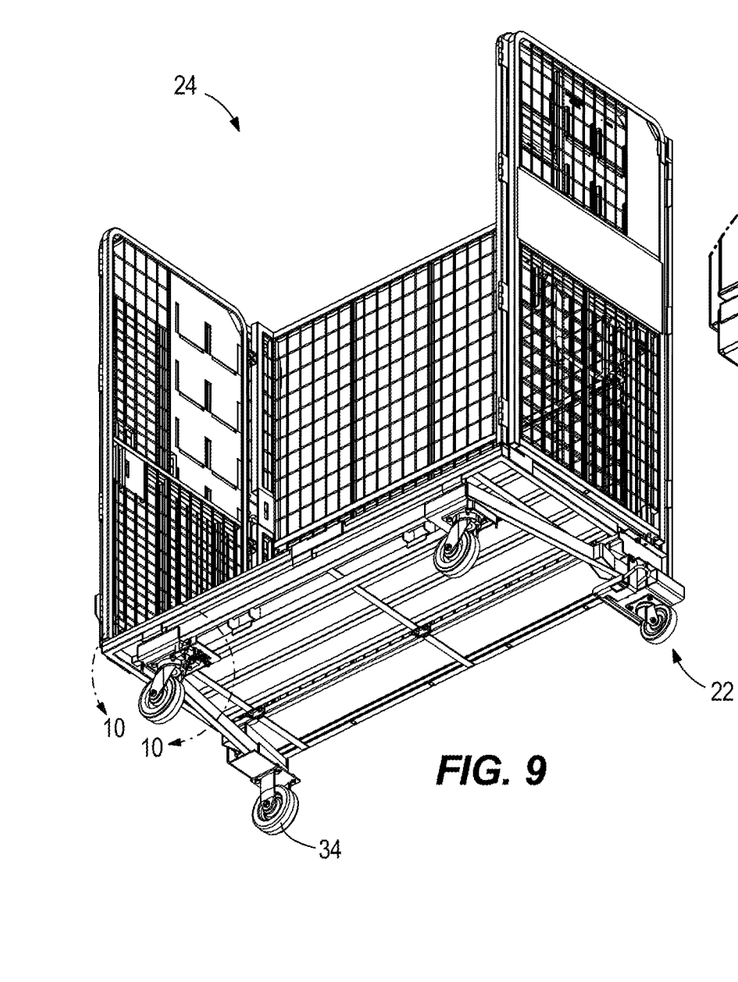
FIG. 9 is a bottom perspective view of the apparatus installed on an exemplary cart.
Figure 10:
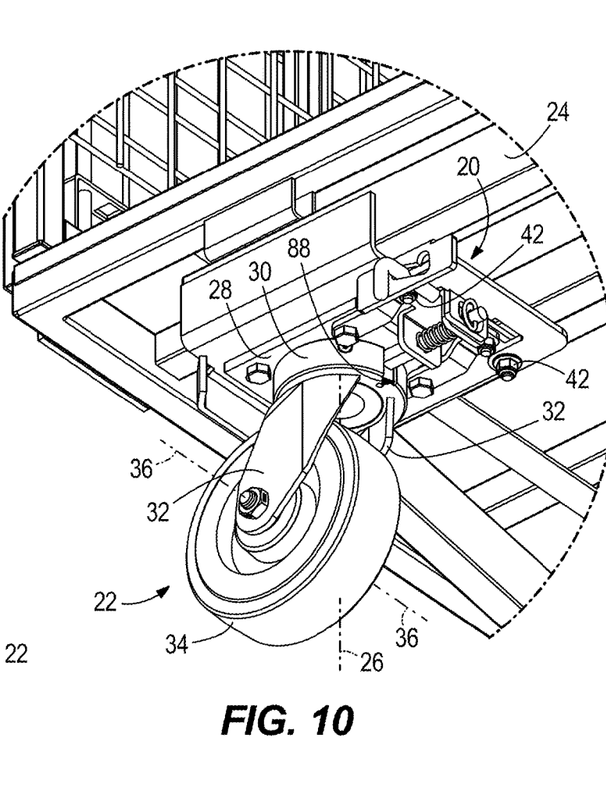
FIG. 10 is a detail view of partial section 10-10, taken in FIG. 9.
Figure 11:
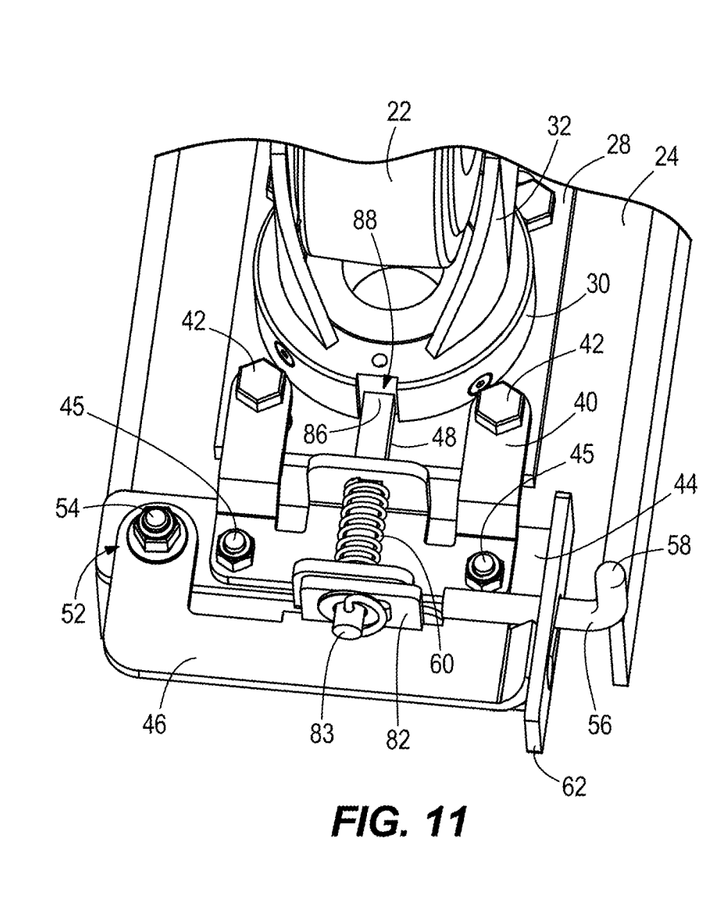
FIG. 11 is a bottom view of the apparatus installed on the cart, in the engaged position.
Figure 12:
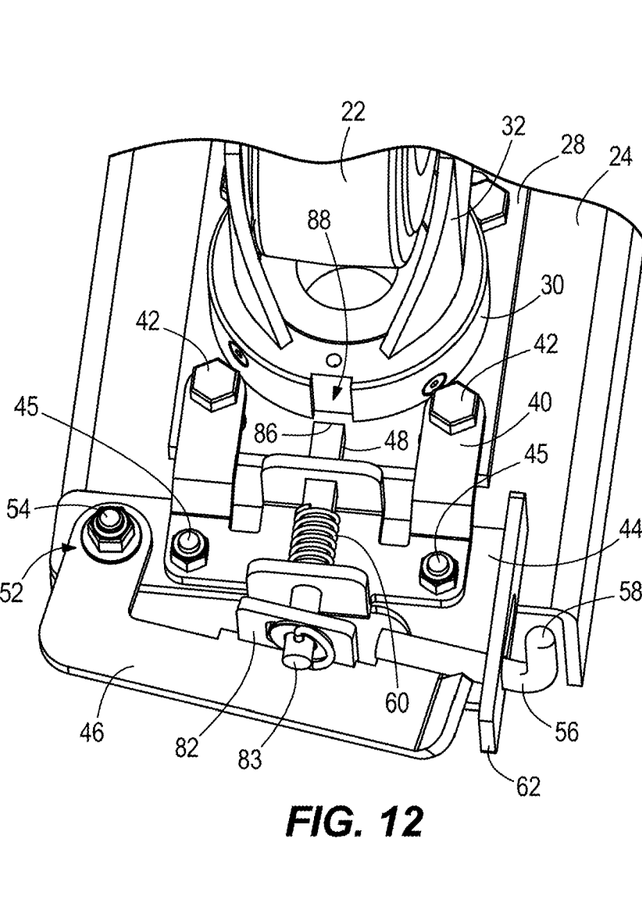
FIG. 12 is a bottom view of the apparatus installed on the cart, in the disengaged position.

Referring to FIGS. 6, 10, and 11, the engagement member 48 has a free end 86 that is sized and shaped to engage with each one of a plurality of radial recesses 88 formed in the raceway 30 of the caster wheel 22. The radial recesses 88 are spaced apart around the raceway 30 and each defines a respective steering position of the caster wheel 22 with respect to the caster wheel axis 26. When the lever arm 46 is in the engaged position, the engagement member 48 is configured to slide along the radially outer surface of the raceway 30 of the caster wheel 22 as the caster wheel 22 is steered about the caster wheel axis 26, until the engagement member 48 becomes aligned with one of the radial recesses 88, whereupon the natural resiliency of the spring 60 biases the engagement member 48 into the radial recess 88 to thereby snap the engagement member 48 into the radial recess 88 and prevent rotation of the raceway 30 about the caster wheel axis 26, thereby locking the caster wheel 22 in the respective steering position.

In the present description, certain terms have been used for brevity, clarity and understanding. No unnecessary limitations are to be inferred therefrom beyond the requirement of the prior art because such terms are used for descriptive purposes only and are intended to be broadly construed.

What is claimed is:

1. An apparatus for locking a caster wheel in a steering position, the apparatus comprising:
   a base member; and
   a lever arm and an engagement member;
   wherein the lever arm is movable with respect to the base member into and between an engaged position in which the engagement member locks the caster wheel in the steering position and a disengaged position in which the caster wheel is steerable out of the steering position; and
   wherein lever arm comprises a first end that is coupled to the base member at a pivot joint and a second end that is configured for engagement by an operator.

2. The apparatus according to claim 1, further comprising a spring that biases the lever arm towards the engaged position.

3. The apparatus according to claim 2, wherein the spring also biases the engagement member into engagement with the caster wheel when the lever arm is in the engaged position.

4. The apparatus according to claim 3, wherein the spring has a natural resiliency that allows the engagement member to be moved out of engagement with the caster wheel when the lever arm is in the engaged position.

5. The apparatus according to claim 4, wherein the base member comprises a first end wall and wherein the spring acts upon the first end wall and on the engagement member.

6. The apparatus according to claim 5, wherein the spring is disposed around the engagement member and has a first end that acts upon the first end wall and a second end that acts upon the engagement member.

7. The apparatus according to claim 6, wherein the engagement member comprises a peripheral abutment surface, wherein the first end of the spring engages the first end wall, and wherein the second end of the spring engages the peripheral abutment surface.

8. The apparatus according to claim 5, wherein the base member comprises a second end wall and wherein the engagement member extends through the first and second end walls.

9. The apparatus according to claim 8, wherein the lever arm comprises a third end wall and wherein the engagement member extends through the third end wall.

10. The apparatus according to claim 9, wherein the first end wall and the third end wall face each other when the lever arm is moved into the engaged position.

11. The apparatus according to claim 9, wherein the engagement member comprises a head that is disposed on an opposite side of the third end wall with respect to the spring, and wherein the spring biases engagement member away from the first end wall, which thereby pulls the head towards the opposite side of the third end wall, thereby biasing the lever arm into the engaged position.

12. The apparatus according to claim 1, further comprising the caster wheel.

13. The apparatus according to claim 12, wherein the engagement member is configured to engage with a radial recess on a raceway of the caster wheel.

14. The apparatus according to claim 13, wherein the radial recess is one of a plurality of radial recesses that are spaced apart around the caster wheel, and wherein the plurality of radial recesses defines a plurality of steering positions of the caster wheel.

15. The apparatus according to claim 14, wherein when the lever arm is in the engaged position, the engagement member is configured to slide along a radially outer surface of the raceway as the caster wheel is steered until the engagement member becomes aligned with one of the radial recesses in the plurality of radial recesses, whereupon the spring biases the engagement member into the radial recess to thereby lock the caster wheel.

16. The apparatus according to claim 1, wherein the base member comprises at least one bracket and further comprising at least one fastener that is configured to fix the at least one bracket with respect to the caster wheel.

17. The apparatus according to claim 16, wherein the at least one bracket comprises a first bracket that is coupled to the caster wheel and a second bracket that is coupled to the first bracket.

18. An apparatus for locking a caster wheel in a steering position, the apparatus comprising:
 a base member; and
 a lever arm and an engagement member;
 wherein the lever arm is movable with respect to the base member into and between an engaged position in which the engagement member locks the caster wheel in the steering position and a disengaged position in which the caster wheel is steerable out of the steering position; and
 wherein the base member comprises a sidewall through which the first end of the lever arm extends.

19. The apparatus according to claim 18, wherein the sidewall comprises an elongated slot through which the first end of the lever arm extends.

20. The apparatus according to claim 19, wherein the elongated slot comprises a first end in which the first end of the lever arm seats when the lever arm is in the engaged position and a second end in which the first end of the lever arm seats when the lever arm is in the disengaged position.

21. The apparatus according to claim 20, wherein the lever arm is slideable back and forth between the first and second ends and further comprising a transverse slot at the second end of the elongated slot, wherein the transverse slot defines a detent that retains the lever arm in the disengaged position until the lever arm is moved transversely to the second end of the elongated slot.

* * * * *